US 9,466,970 B2

(12) United States Patent
Sumi et al.

(10) Patent No.: US 9,466,970 B2
(45) Date of Patent: *Oct. 11, 2016

(54) ESD PROTECTION DEVICE AND METHOD FOR MANUFACTURING THE SAME

(71) Applicant: Murata Manufacturing Co., Ltd., Kyoto (JP)

(72) Inventors: Takahiro Sumi, Kyoto (JP); Jun Adachi, Kyoto (JP); Takayuki Tsukizawa, Kyoto (JP); Kumiko Ishikawa, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/629,860

(22) Filed: Feb. 24, 2015

(65) Prior Publication Data

US 2015/0171618 A1    Jun. 18, 2015

Related U.S. Application Data

(63) Continuation of application No. PCT/JP2013/071948, filed on Aug. 15, 2013.

(30) Foreign Application Priority Data

Aug. 26, 2012    (JP) ................................ 2012-185964

(51) Int. Cl.
*H02H 3/00*    (2006.01)
*H02H 9/00*    (2006.01)
(Continued)

(52) U.S. Cl.
CPC ............... *H02H 3/20* (2013.01); *H01C 7/102* (2013.01); *H01C 7/105* (2013.01); *H01C 7/1006* (2013.01)

(58) Field of Classification Search
USPC ....................................................... 361/56
See application file for complete search history.

(56) References Cited

U.S. PATENT DOCUMENTS 8,432,653 B2 * 4/2013 Adachi .................... H01T 4/12
                                                    257/537
8,455,918 B2 * 6/2013 Adachi .................... H01T 1/20
                                                    257/173
(Continued)

FOREIGN PATENT DOCUMENTS

CN          101933204 A      12/2010
JP          2007-265713 A    10/2007
(Continued)

OTHER PUBLICATIONS

International Search Report issued in Application No. PCT/JP2013/071948 dated Sep. 17, 2013.
(Continued)

*Primary Examiner* — Dharti Patel
(74) *Attorney, Agent, or Firm* — Pearne & Gordon LLP

(57) ABSTRACT

An ESD protection device having high insulation reliability and excellent discharge characteristics is provided. In an ESD protection device including a first and a second discharge electrode disposed to face each other, a discharge auxiliary electrode (18) formed so as to bridge the first and second discharge electrodes, and an insulating substrate holding the first and second discharge electrodes and the discharge auxiliary electrode (18), the discharge auxiliary electrode (18) is formed of an aggregate of metal grains (24) each having a core-shell structure comprising a core portion (22) primarily formed of a first metal and a shell portion (23) primarily formed of a metal oxide containing a second metal, and the aggregate of metal grains (24) further includes an insulating resin (27) which bonds the metal grains (24) to each other.

20 Claims, 5 Drawing Sheets

(51) Int. Cl.
*H02H 3/20* (2006.01)
*H01C 7/10* (2006.01)
*H01C 7/102* (2006.01)
*H01C 7/105* (2006.01)

(56) References Cited

U.S. PATENT DOCUMENTS

| | | | |
|---|---|---|---|
| 9,036,317 B2* | 5/2015 | Suzuki | H01T 1/20 361/112 |
| 2009/0067113 A1* | 3/2009 | Urakawa | H01T 4/12 361/220 |
| 2010/0309595 A1* | 12/2010 | Adachi | H01T 1/20 361/56 |
| 2011/0222197 A1* | 9/2011 | Adachi | H01T 4/12 361/56 |
| 2011/0222203 A1 | 9/2011 | Adachi | |
| 2011/0286142 A1* | 11/2011 | Ikeda | H01L 23/60 361/220 |

FOREIGN PATENT DOCUMENTS

| | | |
|---|---|---|
| JP | 2009-289839 A | 12/2009 |
| WO | 2010/061519 A1 | 6/2010 |

OTHER PUBLICATIONS

Written Opinion issued in Application No. PCT/JP2013/071948 dated Sep. 17, 2013.

* cited by examiner

[A] Core-Shell Structure Forming Step
[B] Step of Bonding Core Portion and Shell Portion
[C] Step of Forming Cavity in Shell Portion

ESD PROTECTION DEVICE AND METHOD FOR MANUFACTURING THE SAME

BACKGROUND OF THE INVENTION

1. Field of the Invention

The present invention relates to an ESD (Electrostatic Discharge) protection device and a method for manufacturing the same, and in particular, relates to improvement of a discharge auxiliary electrode provided to promote an electrostatic discharge in an ESD protection device.

2. Description of the Related Art

The techniques of interest to the present invention include, for example, those described in Japanese Unexamined Patent Application Publication No. 2007-265713 (Patent Document 1).

Patent Document 1 describes an electrostatic countermeasure component which includes at least two lead electrodes provided on a ceramic substrate to face each other and an electrostatic protection material layer provided so as to cover the parts of those lead electrodes and an area located therebetween, and the electrostatic protection material layer is formed from an electrostatic protection material paste which contains a resin and metal grains provided with passive layers at least on the surfaces thereof and which is prepared by mixing those mentioned above.

The electrostatic protection material layer described above is a layer to enhance an effect of suppressing static electricity, that is, in other words, to promote an electrostatic discharge. However, the electrostatic countermeasure component disclosed in Patent Document 1 has a problem in that the discharge starting voltage and the peak voltage cannot be easily decreased. In addition, when static electricity is repeatedly applied, degradation in characteristics, such as increase in discharge starting voltage and peak voltage, may also disadvantageously occur. That is, there has been a problem in that the discharge starting voltage and the peak voltage cannot be easily controlled. The reason for this is that since the thickness of the passive layer formed on the surface of each metal grain contained in the electrostatic protection material layer is relatively small, when static electricity is repeatedly applied thereto, the passive layer is liable to be fractured, and as a result, a short circuit defect occurs.

Patent Document 1: Japanese Unexamined Patent Application Publication No. 2007-265713

BRIEF SUMMARY OF THE INVENTION

Accordingly, the present invention is to provide an ESD protection device which can solve the problems described above, that is, which has high insulating reliability and excellent discharge characteristics and is also to provide a method for manufacturing the ESD protection device described above.

The present invention is directed to an ESD protection device which includes a first and a second discharge electrode disposed to face each other; a discharge auxiliary electrode formed so as to bridge the first and second discharge electrodes; and an insulating substrate holding the first and second discharge electrodes and the discharge auxiliary electrode. In order to solve the technical problems described above, the discharge auxiliary electrode described above is formed of an aggregate of metal grains each having a core-shell structure comprising a core portion primarily formed of a first metal and a shell portion primarily formed of a metal oxide containing a second metal, and the aggregate of the metal grains further includes an insulating resin bonding the metal grains to each other.

As described above, since the metal grains forming the discharge auxiliary electrode are each fully or substantially fully covered with the shell portion primarily formed of the metal oxide, the insulation reliability during discharge can be enhanced.

The thickness of the above shell portion is preferably 50 to 1,500 nm. By the shell portion described above, besides high insulation reliability, excellent discharge characteristics, in particular, a lower peak voltage can be realized.

The second metal is preferably a metal which is more susceptible to oxidation than the first metal. Accordingly, by the use of a manufacturing method which will be described later, the metal grains each having a core-shell structure comprising a core portion primarily formed of a first metal and a shell portion primarily formed of a metal oxide containing a second metal can be easily obtained.

In addition, the first metal preferably includes copper or a copper-based alloy containing copper as a primary component. By this first metal, the ESD protection device can be provided at a relatively inexpensive price. In addition, since copper has a relatively high melting point, the insulation reliability during discharge can be further improved. The reason for this is that when the melting point is low, the metal grains are fused and sintered by heat generated during discharge, and as a result, short circuit may occur in some cases.

In addition, the metal oxide containing the second metal preferably includes aluminum oxide. Since aluminum oxide has high insulation properties, the insulation reliability during discharge can be further improved.

In addition, besides the first metal, the core portion may also contain the second metal as an accessory component in some cases. When the core portion contains the second metal, even if the shell portion is fractured by some reason, the shell portion can be restored by heat generated during discharge.

The shell portion may have at least one cavity. In this case, since the thickness of the shell portion is decreased around the cavity, discharge can be started at a relatively low ESD application voltage.

The present invention may also be directed to a method for manufacturing an ESD protection device.

The method for manufacturing an ESD protection device of the present invention comprises the steps of: preparing an insulating substrate; forming a first and a second discharge electrodes on the insulating substrate with a discharge gap provided therebetween; preparing metal grains each having a core-shell structure comprising a core portion primarily formed of a first metal and a shell portion primarily formed of a metal oxide containing a second metal more susceptible to oxidation than the first metal; preparing an insulating resin; mixing the metal grains and the insulating resin to form a discharge auxiliary electrode paste; applying the discharge auxiliary electrode paste to the insulating substrate so as to cover the discharge gap and connect the first and second discharge electrodes; and curing the discharge auxiliary electrode paste to provide a discharge auxiliary electrode.

In addition, the step of preparing metal grains each having a core-shell structure includes:

(1) a step of preparing an alloy powder of an alloy containing the first metal and the second metal;

(2) a core-shell structure forming step in which the alloy powder is heat-treated in an atmosphere at an oxygen concentration at which the first metal is not oxidized and the second metal is oxidized so that in each of the metal grains forming the alloy powder, the second metal is moved to the surface of the metal grain and is oxidized when reaching the surface thereof to form the metal oxide containing the second metal, the shell portion is formed from the metal oxide as a primary component, and the core portion is formed from the first metal as a primary component which remains after the movement of the second metal to the surface of the alloy grain; and (3) a core-shell bonding step in which a heat treatment is then performed so that in each of the metal grains, the core portion primarily formed of the first metal and the shell portion primarily formed of the metal oxide containing the second metal are bonded to each other.

The step of preparing metal grains each having a core-shell structure may further include a cavity forming step. The cavity forming step is preferably performed following the above core-shell bonding step in such a way that by decreasing the temperature of the heat treatment performed in the above step, in each of the metal grains, the core portion primarily formed of the first metal is more contracted than the shell portion primarily formed of the metal oxide containing the second metal to form at least one cavity in the shell portion. When the cavity forming step as described above is employed, metal grains each having a shell portion provided with a cavity can be easily obtained.

The alloy powder described above is preferably manufactured by an atomizing method. By the atomizing method, the composition of the alloy can be easily controlled. The present inventor has knowledge that by changing the composition ratio between the first metal and the second metal, which form the alloy, in the core-shell forming step, the thickness of the shell portion formed of the metal oxide containing the second metal can be controlled. In addition, it is also known that by changing the grain diameter of the metal grains forming the alloy powder, the thickness of the shell portion formed of the metal oxide containing the second metal can also be controlled.

According to the ESD protection device of the present invention, the metal grains forming the discharge auxiliary electrode are each fully or substantially fully covered with the shell portion primarily formed of the metal oxide, even if static electricity is repeatedly applied, the characteristics are not likely to be degraded, and hence the insulation reliability during discharge can be enhanced. In addition, even when the content of the metal grains is increased, since short circuit is not likely to occur between the metal grains, discharge can be easily performed by increasing the content of the metal grains, and as a result, the peak voltage can be decreased.

In addition, when the cavity is provided in the shell portion of the metal grain forming the discharge auxiliary electrode, the thickness of the shell portion around the cavity is decreased, and hence, discharge can be started at a relatively low ESD application voltage.

Accordingly, the ESD protection device of the present invention can be widely used for protection of various types of devices and apparatuses, such as a semiconductor device.

According to the method for manufacturing an ESD protection device of the present invention, in order to obtain the metal grains each having a core-shell structure, in the core-shell structure forming step, the heat treatment is performed in an atmosphere at an oxygen concentration at which the first metal is not oxidized and the second metal is oxidized. By this heat treatment, in each of the metal grains forming the alloy powder, since the second metal is oxidized when precipitated on the surface of the metal grain, the shell portion is primarily formed from the metal oxide containing the second metal, and in addition, the core portion is formed from the first metal which remains after the movement of the second metal to the surface of the metal grain. Accordingly, the metal grains each substantially fully covered with the shell portion primarily formed of the metal oxide can be easily obtained.

BRIEF DESCRIPTION OF THE SEVERAL VIEWS OF THE DRAWINGS

FIG. 6(A) is a plan view of a prepared insulating substrate 12, and FIG. 6(B) is a plan view of a mother board 31 from which a plurality of the insulating substrates 12 are obtained by cutting thereof.

DETAILED DESCRIPTION OF THE INVENTION

Figure 1:
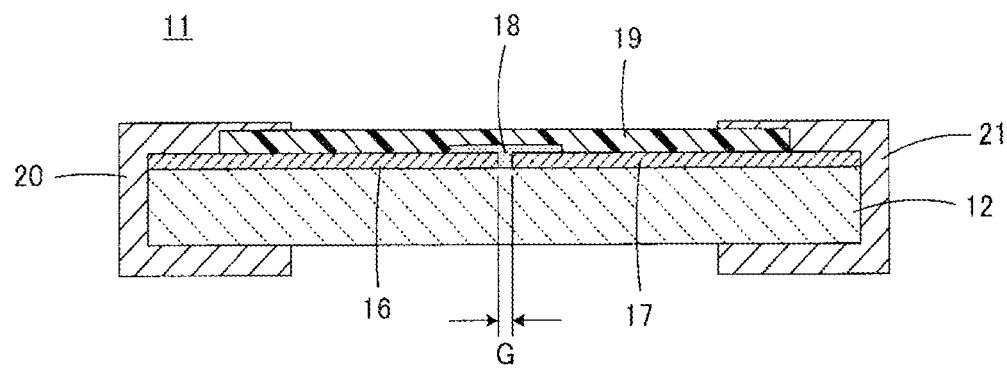
FIG. 1 is a cross-sectional view showing an ESD protection device 11 according to one embodiment of the present invention.

With reference to FIG. 1, an ESD protection device 11 according to one embodiment of the present invention will be described.

The ESD protection device 11 includes an insulating substrate 12. The insulating substrate 12 is formed, for example, from a low temperature co-fired ceramic (LTCC), such as glass ceramic; a high temperature co-fired ceramic (HTCC), such as aluminum nitride or alumina; or a magnetic ceramic, such as ferrite.

On the insulating substrate 12, there are provided first and second discharge electrodes 16 and 17 disposed so as to face each other with a predetermined gap provided therebetween, a discharge auxiliary electrode 18 formed so as to bridge the first and second discharge electrodes 16 and 17, and a protective layer 19 formed so as to cover at least the discharge auxiliary electrode 18. The protective layer 19 is formed, for example, from a curable resin containing a ceramic powder as a filler.

At two end portions of the insulating substrate 12, first and second outer terminal electrodes 20 and 21 are formed. The first and second outer terminal electrodes 20 and 21 are electrically connected to the first and second discharge electrodes 16 and 17, respectively.

In the ESD protection device 11 as described above, as shown in FIG. 2, the discharge auxiliary electrode 18 is formed of an aggregate of metal grains 24 each having a core-shell structure comprising a core portion 22 primarily formed of a first metal and a film-shaped shell portion 23 primarily formed of a metal oxide containing a second metal. When the metal grain 24 forming the discharge auxiliary electrode 18 has a core-shell structure as described above and is fully or substantially fully covered with the shell portion 23 primarily formed of a metal oxide, the insulation reliability during discharge can be enhanced.

In addition, as long as the insulation reliability is not substantially impaired, the metal grain 24 may have a slight portion which is not covered with the shell portion 23 primarily formed of a metal oxide. When the total peripheral length of the core portion 22 of the metal grain 24 and the length of the periphery of the core portion 22 covered with the shell portion 23 are represented by L1 and L2, respectively, the structure having a ratio L2/L1 of 75% or more is defined as the "core-shell structure" of the present invention.

In the shell portion 23, at least one cavity 26 may be formed. As described above, when the cavity 26 is present in the shell portion 23, since the thickness of the shell portion 23 around the cavity 26 is decreased, discharge can be started at a relatively low ESD application voltage.

In the core portion 22, there are preferably many portions each having a concave 28 in the vicinity of the cavity 26 so as to conform therewith. By the presence of the concave 28, since charge is likely to be concentrated at this concave 28 portion, discharged is likely to occur, so that the discharge characteristics are improved, and in particular, a lower peak voltage can be realized. In addition, at many places, a wall surface 29 defining the cavity 26 located at a core portion 22 side has a shape approximately along a wall surface 30 which defines the periphery of the core portion 22. This indicates that the cavity 26 should be discriminated from a void present between the metal grains 24.

In addition, the aggregate of the metal grains 24 of the discharge auxiliary electrode 18 further includes an insulating resin 27 which bonds the metal grains 24 to each other. The insulating resin 27 is preferably formed of a curable resin such as a thermally curable resin or a UV curable resin. The insulating resin 27 functions to maintain the shape of the discharge auxiliary electrode 18 which is formed of the aggregate of the metal grains 24.

A method for forming the above cavity 26 is to be disclosed together with a method for manufacturing the ESD protection device 11 which will be described later.

As apparent from experimental examples which will be described later, the thickness of the shell portion is preferably 50 to 1,500 nm. By this thickness, besides high insulation reliability, excellent discharge characteristics, in particular, a lower peak voltage, can be realized. When the thickness of the shell portion is less than 50 nm, it may be estimated that the shell portion is probably partially fractured by an impact generated at ESD application, or that the insulation properties of the shell portion is probably degraded due to diffusion of a first metal component of the core portion to the shell portion. In addition, when the thickness of the shell portion is more than 1,500 nm, since the thickness thereof is large, it may be estimated that the creeping discharge amount at ESD application is decreased.

When a metal which is more susceptible to oxidation than the first metal is used as the second metal, by the use of the manufacturing method which will be described later, the metal grains 24 each having a core-shell structure comprising the core portion 22 primarily formed of the first metal and the shell portion 23 primarily formed of the metal oxide containing the second metal can be easily obtained.

For example, as the first metal, copper or a copper-based alloy containing copper as a primary component may be used. When copper or a copper-based alloy is used as the first metal, for example, aluminum, nickel, bismuth, gallium, germanium, indium, magnesium, phosphorus, silicon, or tin may be used as the second metal.

As the first metal, besides the metals mentioned above, silver, aluminum, molybdenum, tungsten, or the like may also be use. In any cases, a metal which is more susceptible to oxidation than the first metal may be selected as the second metal.

As described above, although a metal which is more susceptible to oxidation than the first metal is selected as the second metal, in particular, aluminum oxide is preferable as the metal oxide containing the second metal. The reason for this is that since this oxide has high insulation properties, it can further improve the insulation reliability during discharge.

The ESD protection device 11 is formed, for example, by the following method.

First, as described above, the insulating substrate 12 formed, for example, from a LTCC, a HTCC, or a magnetic ceramic is prepared.

In addition, in order to obtain the metal grains 24 contained in the discharge auxiliary electrode 18, an alloy powder formed of an alloy containing the first metal and the second metal which is more susceptible to oxidation than the first metal is prepared. This alloy powder is preferably manufactured by an atomizing method. By an atomizing method, the composition of the alloy can be easily controlled.

Figure 4:
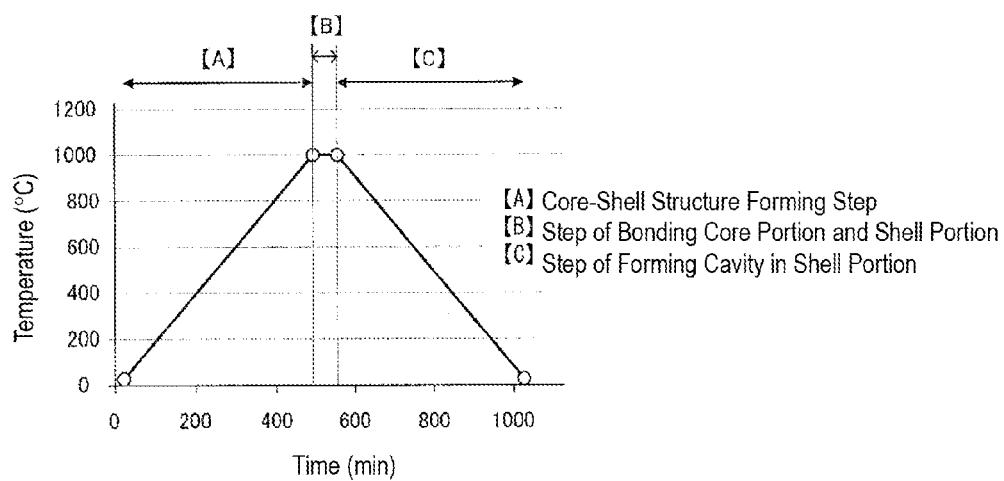
FIG. 4 is a view illustrating a step of manufacturing the ESD protection device 11 formed in an experimental example and showing a heating profile used in a heat treatment step performed on an alloy powder to obtain the metal grain 24 shown in FIG. 2.

Next, a heat treatment is performed on the alloy powder described above. This heat treatment is divided into the following three steps, according to a phenomenon occurred in each of the alloy grains forming the alloy powder: (1) a core-shell structure forming step; (2) a step of bonding the core portion and the shell portion; and (3) a step of forming a cavity in the shell portion. Hereinafter, the above steps will be described in detail. In addition, in this description, if necessary, FIG. 4 showing a firing profile employed in the following experimental example will be used for reference.

(1) Core-Shell Structure Forming Step

This step is performed in an atmosphere at an oxygen concentration at which the first metal forming the alloy powder is not oxidized and the second metal is oxidized. This step corresponds to the temperature rise step [A] in FIG. 4, and the object of this step is that in each of the alloy grains forming the alloy powder, the core portion 22 primarily formed of the first metal is formed by moving the second metal to the surface of the alloy grain, and the shell portion 23 primarily formed of the metal oxide containing the second metal is formed by oxidizing the second metal at the arrival thereof at the surface of the alloy grain.

Figure 3:
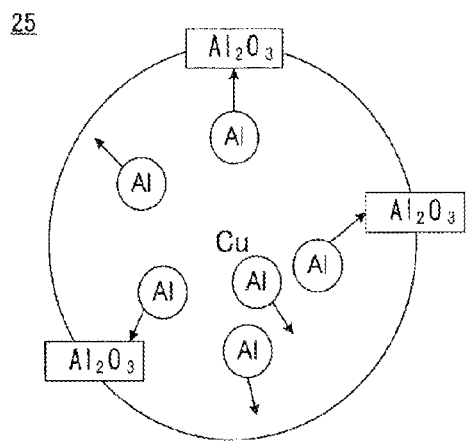
FIG. 3 is a cross-sectional view of an alloy grain 25 which is prepared to obtain a metal grain 24 contained in the discharge auxiliary electrode 18 shown in FIG. 2, the view schematically showing the behavior of Al functioning as a second metal generated in a heat treatment step.

Based on the assumption that the first metal forming the alloy is Cu, and the second metal is Al, the above step will be described in detail with reference to FIG. 3. In FIG. 3, one alloy grain 25 forming the alloy powder is shown.

As the heat treatment is progressed, during the temperature rise step [A] in FIG. 4, in the alloy grain 25 formed of Cu and Al, Al is moved to the surface of the alloy grain 25 as show by the arrows, and when reaching the surface, Al is oxidized into $Al_2O_3$. Hence, the shell portion of the alloy grain 25 is formed from $Al_2O_3$. As apparent from this phenomenon, at the core portion of the alloy grain 25, Al functioning as the second metal may remain in some cases.

When the alloy powder is manufactured using an atomizing method, the composition of the alloy can be easily controlled as described above, and in addition, it has been also known that if the composition ratio between the first metal and the second metal forming the alloy is changed, by the heat treatment described above, the thickness of the shell portion formed of the metal oxide containing the second metal can be controlled. Hence, in order to obtain a preferable thickness of the shell portion of 50 to 1,500 nm described above, for example, the control of the composition ratio between the first metal and the second metal is performed. In addition, it has been also known that by changing the grain diameter of the alloy grain 25, the thickness of the shell portion formed of the metal oxide containing the second metal can be controlled.

Although the temperature in this step is not particularly limited, the step is preferably performed in a range of 500° C. to 900° C. When the temperature is less than 500° C., the movement of a second metal component to the surface of the alloy grain becomes slow, and as a result, a shell portion having sufficient thickness and uniformity may not be formed in some cases. On the other hand, when the temperature is more than 900° C., the movement of the second metal component to the surface of the alloy grain becomes uneven, and a shell having sufficient thickness and uniformity may not be formed in some cases.

The oxygen concentration in this step is set to an oxygen concentration at which the first metal component forming the alloy grain is not oxidized, and the second metal component is oxidized. The oxygen concentration is not particularly limited as long as the conditions described above are satisfied. The oxygen concentration may be adjusted, for example, by mixing $H_2$, $H_2O$, and $N_2$.

In addition, when the oxygen concentration is set so that the first metal component is oxidized, the first metal component itself is oxidized, and the movement of the second metal component to the surface of the alloy grain is inhibited, so that a shell having sufficient thickness and uniformity may not be formed in some cases. In contrast, when the oxygen concentration is set so that neither the first metal component nor the second metal component are oxidized, a shell having sufficient thickness and uniformity may not be formed in some cases.

A holding time of this step is preferably set to at least 30 to 800 minutes at a temperature in a range of 500° C. to 900° C. When the holding time is less than 30 minutes, the movement of the second metal component to the surface of the alloy grain becomes insufficient, and a shell having sufficient thickness and uniformity may not be formed in some cases. When the holding time is more than 800 minutes, the productivity is remarkably decreased.

(2) Step of Bonding Core Portion and Shell Portion

This step corresponds to a top temperature keeping step [B] in FIG. 4, and the object of this step is to bond the core portion primarily formed of the first metal and the shell portion primarily formed of the metal oxide containing the second metal.

Although the temperature in this step is not particularly limited, this step is required to be performed at a temperature less than the melting point of the first metal component. When the temperature is set to the melting point of the first metal component or more, since the core portion is fused, the core-shell structure is fractured, and as a result, the ESD protection characteristics cannot be secured.

The oxygen concentration in this step is preferably set to an oxygen concentration at which the second metal component is not reduced. The oxygen concentration is more preferably set so that the first metal component is not oxidized and the second metal component is oxidized. When the oxygen concentration is set so that the second metal component is reduced, the shell portion is fractured, and the ESD protection characteristics are degraded. When the oxygen concentration is set so that the first metal component is not oxidized and the second metal component is not reduced, the core portion and the shell portion are bonded to each other, and sintering among the oxides in the shell portion is preferably performed, so that in the following step of forming a cavity in the shell portion, a shell having a cavity can be easily formed. In addition, the oxygen concentration may be adjusted, for example, by mixing $H_2$, $H_2O$, and $N_2$.

A holding time in this step is preferably set to 10 to 300 minutes. When the holding time is less than 10 minutes, the bond between the core portion and the shell portion may not be secured in some cases. When the holding time is more than 300 minutes, the metal oxides in the shell portion are excessively sintered to each other, and in the following step of forming a cavity in the shell portion, a shell having a cavity is difficult to be formed.

(3) Step of Forming Cavity in Shell Portion

This step corresponds to a temperature drop step [C] in FIG. 4, and the object of this step is to form a shell portion having at least one cavity. By using a general phenomenon in which the coefficient of thermal expansion of a metal is higher than that of an oxide, in this step, the core portion primarily formed of the metal is more contracted than the shell portion primarily formed of the oxide. In this step, since the parts of the shell portion bonded to the core portion are only contracted while being bonded thereto, the structural disorder occurs in the shell portion, and as a result, at least one cavity is generated in the shell portion.

The temperature in this step is not particularly limited as long as being lower than that at the above step (2) of boding a core portion and a shell portion. The temperature is preferably set to be lower than that in the above step (2) of bonding a core portion and a shell portion by 100° C. or more. When the difference in temperature is less than 100° C., the contraction of the core portion is small, and a sufficiently large cavity may not be formed in some cases.

The oxygen concentration in this step is preferably set to an oxygen concentration at which the second metal component is not reduced. The oxygen concentration is more preferably set so that the first metal component is not oxidized and the second metal component is oxidized. When the oxygen concentration is set so that the second metal component is reduced, the shell portion is fractured, and the ESD protection characteristics are degraded. In addition, when the oxygen concentration is set so that the first metal component and the second metal component are both oxidized, oxygen molecules passing through the shell portion oxidize the first metal component, and by the oxidation expansion of the first metal component, the shell portion may be fractured in some cases. When the oxygen concentration is set so that the first metal component is not oxidized and the second metal component is not reduced, a shell having a cavity is likely to be formed. In addition, the oxygen concentration may be adjusted, for example, by mixing $H_2$, $H_2O$, and $N_2$.

A holding time in this step is preferably set to 30 minutes or more. When the holding time is less than 30 minutes, the formation of a shell portion having a cavity tends to be difficult.

A typical structure of the metal grain 24 obtained as described above is shown in FIG. 5. The metal grain 24 has a core-shell structure, and in this structure, the core portion 22 primarily formed of the first metal and the shell portion 23 primarily formed of the metal oxide containing the second metal which is more susceptible to oxidation than the first metal are formed, and the cavities 26 are formed in the shell portion 23.

Next, an uncured insulating resin 27 formed, for example, of a thermosetting resin is prepared, and the metal grains 24 are added thereto, followed by performing a dispersion treatment, so that a discharge auxiliary electrode paste in which the metal grains 24 are dispersed in the insulating resin 27 is formed.

In addition, in order to form the discharge electrodes 16 and 17, a discharge electrode paste is prepared which is formed by mixing a conductive metal powder, a glass frit, and an organic vehicle together with, if necessary, a ceramic powder.

In addition, in order to form the protective layer 19, a protective layer paste is prepared which is formed, for example, from an uncured thermosetting resin containing a ceramic powder as a filler.

In addition, in order to form the outer terminal electrodes 20 and 21, an outer terminal electrode paste is prepared which is formed by mixing a conductive metal powder and an uncured thermosetting resin.

Next, the discharge electrode paste is applied on the insulating substrate 12 and is then fired, so that the first and second discharge electrodes 16 and 17 are formed with a predetermined gap G provided therebetween.

Figure 2:
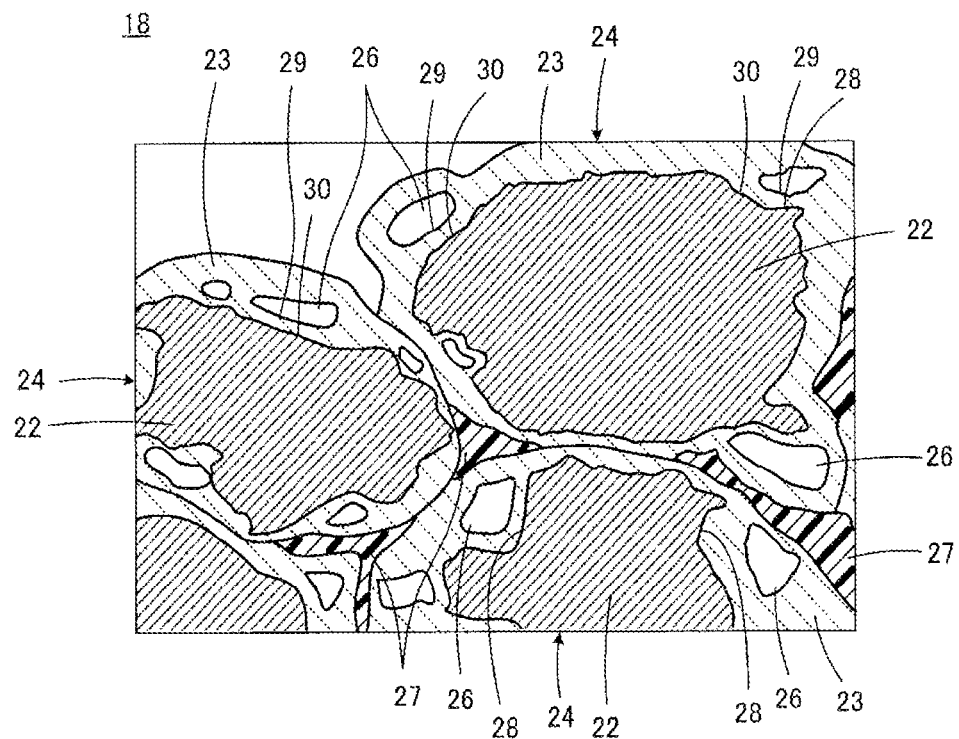
FIG. 2 is a partially enlarged cross-sectional view of a discharge auxiliary electrode 18 shown in FIG. 1.

Subsequently, the discharge auxiliary electrode paste is applied so as to cover the gap G between the first and second discharge electrodes 16 and 17 and to connect the first and second discharge electrodes 16 and 17 and is then heat-cured, so that the discharge auxiliary electrode 18 is formed. In this step, as shown in FIG. 2, the discharge auxiliary electrode 18 is formed of an aggregate of the metal grains 24 each having a core-shell structure, and in this aggregate, the metal grains 24 are bonded to each other with the insulating resin 27 interposed therebetween.

Next, the protective layer paste is applied so as to cover the discharge auxiliary electrode 18 and the parts of the first and second discharge electrodes 16 and 17 and is then heat-cured, so that the protective layer 19 is formed.

Next, the outer terminal electrode paste is applied to the two end portions of the insulating substrate 12 so as to be electrically connected to the first and second discharge electrodes 16 and 17 which are exposed from the protective layer 19 and is then heat-cured, so that the first and second outer terminal electrodes 20 and 21 are formed.

As described above, the ESD protection device 11 is completed.

In addition, when the discharge auxiliary electrode paste, the discharge electrode paste, the protective layer paste, and the outer terminal electrode paste are applied, the paste may be directly applied on the target object or may be applied thereto using a transfer method.

In addition, among the heat curing steps for the discharge auxiliary electrode paste, the discharge electrode paste, the protective layer paste, and the outer terminal electrode paste, heat curing steps for at least two types of pastes may be simultaneously performed.

Next, experimental examples performed to confirm the effect of the present invention will be described.

Experimental Examples

Formation of Evaluation Sample (1) Formation of Metal Grains

As an alloy powder before heat treatment, alloy powders S-1 to S-5 shown in Table 1 were prepared. Those alloy powders were each formed by an atomizing method. The "Grain Distribution" shown in Table 1 was determined by a laser diffraction grain distribution method. In addition, the "Composition" shown in Table 1 was determined by an ICP-AES method (inductively-coupled plasma atomic emission spectrometry).

TABLE 1

| Alloy Powder | | Composition (Percent by Mole) | | Grain Distribution (µm) | | |
|---|---|---|---|---|---|---|
| Symbol | Type of Metal | Cu | Al | D10 | D50 | D90 |
| S-1 | Cu—Al-Based Alloy | 95 | 5 | 1.2 | 2.5 | 5.4 |
| S-2 | Cu—Al-Based Alloy | 80 | 20 | 1.2 | 2.5 | 5.4 |
| S-3 | Cu—Al-Based Alloy | 60 | 40 | 1.2 | 2.5 | 5.1 |
| S-4 | Cu—Al-Based Alloy | 90 | 10 | 0.8 | 1.3 | 2.6 |
| S-5 | Cu—Al-Based Alloy | 50 | 50 | 0.8 | 1.3 | 2.6 |

Next, a heat treatment was performed on each of the alloy powders S-1 to S-5 shown in Table 1 in accordance with the heating profile shown in FIG. 4 to provide metal powders M-1 to M-9 shown in Table 2. In the column of the "Alloy Powder" in Table 2, the "Alloy Powder Symbol" shown in Table 1 of an alloy powder which was heat treated is shown.

In the heat treatment, the oxygen concentration in an atmosphere of a firing furnace was controlled by changing the ratio among $N_2$, $H_2$, and $H_2O$ so that in each of [A] the core-shell structure forming step, [B] the step of bonding a core portion and a shell portion, and [C] the step of forming a cavity in a shell portion shown in FIG. 4, the metal or the oxide shown in each of the columns [A], [B], and [C] of the "Heat Treatment Conditions" in Table 2 was placed in a stable state.

For example, the case of Sample 1 will be described. In [A] "Core-Shell Structure Forming Step", an oxygen concentration at which Cu in the form of "Cu" and Al in the form of "$Al_2O_3$" are stable is regarded as a stable oxygen concentration: in [B] "Step of Bonding Core Portion and Shell Portion", an oxygen concentration at which Cu in the form of "Cu" and Al in the form of "$Al_2O_3$" are stable is regarded as a stable oxygen concentration; and in [C] "Step of Forming Cavity in Shell Portion", an oxygen concentration at which Cu in the form of "Cu" and Al in the form of "$Al_2O_3$" are stable is regarded as a stable oxygen concentration.

In addition, the oxygen partial pressure at which each metal used in each of the metal powders M-1 to M-9 is oxidized at a temperature T (K) is calculated by the following formulas.

$$\ln(Cu_{PO2}) > \{-338904 + (-33T \log T) + 247T\}/(8.314T)$$

$$\ln(Al_{PO2}) > \{-1117993 + (-11T \log T) + 244T\}/(8.314T)$$

TABLE 2

| Metal Powder Symbol | Alloy Powder | Heat Treatment Conditions [A] Core-Shell Structure Forming Step | [B] Step of Boding Core Portion and Shell Portion | [C] Step of Forming Cavity in Shell Portion | Grain Distribution (μm) D10 | D50 | D90 | Core-Shell Structure | Cavity | Shell Portion Type of Metal Oxide | Thickness (nm) |
|---|---|---|---|---|---|---|---|---|---|---|---|
| M-1 | S-1 | Cu Al₂O₃ | Cu Al₂O₃ | Cu Al₂O₃ | 1.8 | 3.1 | 6.2 | ○ | ○ | Al₂O₃ | 50-300 |
| M-2 | S-2 | Cu Al₂O₃ | Cu Al₂O₃ | Cu Al₂O₃ | 1.8 | 2.8 | 5.9 | ○ | ○ | Al₂O₃ | 100-1000 |
| M-3 | S-3 | Cu Al₂O₃ | Cu Al₂O₃ | Cu Al₂O₃ | 1.6 | 2.7 | 5.5 | ○ | ○ | Al₂O₃ | 200-1500 |
| M-4 | S-4 | Cu Al₂O₃ | Cu Al₂O₃ | Cu Al₂O₃ | 1.8 | 1.9 | 3.8 | ○ | ○ | Al₂O₃ | 20-150 |
| M-5 | S-5 | Cu Al₂O₃ | Cu Al₂O₃ | Cu Al₂O₃ | 1.2 | 1.6 | 3.0 | ○ | ○ | Al₂O₃ | 100-1000 |
| M-6 | S-1 | Cu₂O Al₂O₃ | Cu Al₂O₃ | Cu Al₂O₃ | 2.3 | 3.6 | 6.8 | X | — | — | — |
| M-7 | S-1 | Cu Al₂O₃ | Cu Al₂O₃ | Cu₂O Al₂O₃ | 2.3 | 3.4 | 6.8 | ○ | ○ | Al₂O₃ | 50-300 |
| M-8 | S-1 | Cu Al₂O₃ | Cu₂O Al₂O₃ | Cu Al₂O₃ | 2.1 | 3.4 | 6.6 | ○ | ○ | Al₂O₃ | 50-300 |
| M-9 | S-1 | Cu Al₂O₃ | Cu₂O Al₂O₃ | Cu₂O Al₂O₃ | 2.1 | 3.5 | 6.5 | ○ | ○ | Al₂O₃ | 50-300 |

The "Grain Distribution" shown in Table 2 was determined by a laser diffraction grain distribution method.

The "Core-Shell Structure", and the "Cavity", "Type of Metal Oxide", and "Thickness" of the "Shell Portion" were determined by the following methods.

The metal powder of each sample was buried in an epoxy resin, and curing thereof was performed. After the curing was performed, the cross section of the metal grain forming the metal powder was exposed by polishing. Subsequently, FIB (focused ion beam) processing was performed on the metal grain exposed by polishing. STEM (scanning transmission electron microscope) observation was performed on the metal grain sampled by the FIB processing, and analysis of the various types of metals and oxygen was performed by an EDS (energy dispersive X-ray spectrometer). The STEM observation was performed at an accelerating voltage of 5 kV and a magnification of 5,000 and 25,000 times.

In the STEM observation, the length L1 of the total periphery of the core portion and the length L2 of the periphery of the core portion covered with the metal oxide were calculated. A structure having an L2/L1 ratio of 75% percent or more was judged as the core-shell structure, and "○" is shown in the column of the "Core-Shell Structure" in Table 2. In contrast, a structure having an L2/L1 ratio of less than 75% was judged as a non-core-shell structure, and "x" is shown in the column of the "Core-Shell Structure" in Table 2.

In addition, in a STEM observation field, when there were at least two metal grains in each of which the cavity was observed in the shell portion, "○" is shown in the column of the "Cavity" in Table 2. In contrast, if no cavity was observed in the shell portion, "x" is shown in the same column as described above.

In addition, the thickness of the shell portion was calculated from a STEM image, and the result thereof is shown in the column of the "Thickness" in Table 2.

Furthermore, by the EDS analysis, the qualitative analysis of the type of metal oxide of the shell portion was performed from the oxygen component and the metal component, and the type of metal oxide thus qualitatively analyzed is shown in the column of the "Type of Metal Oxide" in Table 2.

Figure 5:
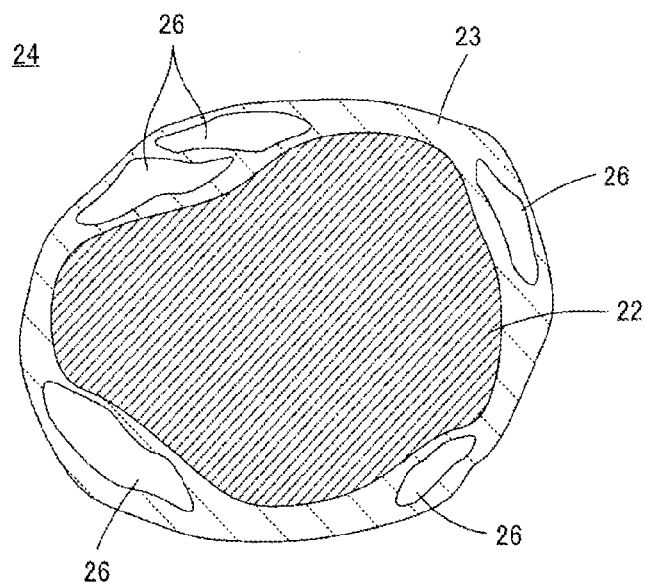
FIG. 5 is a view illustrating a step of manufacturing the ESD protection device 11 formed in the experimental example and showing the metal grain 24 forming a metal powder obtained by the heat treatment step shown in FIG. 4, the view being formed by tracing a STEM image of the metal grain 24.

FIG. 5 is a view formed as one example by tracing a STEM image of the metal grain 24 forming the metal powder M-2. Although not shown in the figure, in an alloy grain forming the alloy powder S-2 to be heat-treated to obtain the metal powder M-2, an apparent shell portion was not observed at the grain surface. In addition, by the EDS analysis, in the above alloy grain, a Cu component and an Al component were located at approximately the same position. Furthermore, when this alloy grain was analyzed by XRD (powder X-ray diffraction), an AlCu₃ component and a Cu component were detected.

In contrast, in the metal grain 24 forming the metal powder M-2 obtained by a heat treatment, as apparent from FIG. 5, a core-shell structure which had a shell portion 23 having the cavities 26 was observed. In addition, although not shown in the figure, from an EDS image, it was confirmed that the core portion 22 contained a Cu component as a primary component, and that the shell portion 23 was formed of an oxide containing Al as a primary component. Furthermore, when the core portion 22 was analyzed by XRD, although a Cu component was detected, an Al₂O₃ component was not confirmed. From the results described above, it was suggested that the shell portion 23 primarily formed of an Al component was amorphous (glass component-containing material).

The results similar to those described above were also confirmed in the metal powders M-1, M-3 to M-5, and M-7 to M-9.

In addition, in the metal powder M-6, the core-shell structure was not observed. Hence, the "Shell Portion" was not evaluated. In the metal powder M-6, it is estimated that since the oxygen concentration at which Cu was oxidized was used in the heat treatment step, the core-shell structure was not formed.

Besides the metal powders M-1 to M-9 shown in Table 2, metal powders M-10 to M-12 shown in Table 3 were also prepared. The metal powders M-10 and M-11 were each formed by an atomizing method. The metal powder M-12 was formed by coating a copper powder prepared by a wet synthetic method with a nano-sized alumina powder prepared by a mechano-fusion method.

TABLE 3

| Metal Powder | | Composition (Percent by Mole) | | Grain Distribution (μm) | | | Core-Shell Structure | Shell Portion | | |
|---|---|---|---|---|---|---|---|---|---|---|
| | | | | | | | | | Type of Metal Oxide | Thickness (nm) |
| Symbol | Type of Metal | Cu | Al | D10 | D50 | D90 | | Cavity | | |
| M-10 | Al | — | 100 | 1.2 | 2.5 | 5.4 | ○ | X | Al$_2$O$_3$ | ≥10 |
| M-11 | Cu | 100 | — | 1.2 | 2.5 | 5.4 | X | X | — | — |
| M-12 | Al$_2$O$_3$-Coated Cu | 95 | 5 | 2.3 | 2.8 | 3.9 | X | X | — | — |

As in the case of the metal powders M-1 to M-9 shown in Table 2, the "Core-Shell Structure", and the "Cavity", "Type of Metal Oxide", and "Thickness" of the "Shell Portion" of each of the metal powders M-10 to M-12 shown in Table 3 were also evaluated.

(2) Formation of Discharge Auxiliary Electrode Paste

After each of the metal powders M-1 to M-12 shown in Tables 2 and 3 and a thermosetting silicone resin were blended together at a volume ratio of 40:60, a dispersion treatment was performed using a three-roll mill to provide a discharge auxiliary electrode paste.

(3) Formation of Discharge Electrode Paste

After 80 percent by weight of a copper powder having an average particle diameter of approximately 1 μm, 5 percent by weight of a borosilicate alkaline-based glass frit having a transition point of 620° C., a softening point of 720° C., and an average particle diameter of approximately 1 μm, 1 percent by weight of an alumina powder having an average particle diameter of approximately 0.02 μm, and 14 percent by weight of an organic vehicle formed by dissolving ethyl cellulose in terpineol were blended together with a three-roll mill to prepare a discharge auxiliary electrode paste.

(4) Formation of Protective Layer Paste

After 40 percent by weight of a mullite powder having an average particle diameter of approximately 0.5 μm and 60 percent by weight of a thermosetting silicone resin were blended together with a three-roll mill to prepare a protective layer paste.

(5) Formation of Outer Terminal Electrode Paste

After 80 percent by weight of a silver powder having an average particle diameter of approximately 1 μm and 20 percent by weight of a thermosetting epoxy resin were blended together with a three-roll mill to prepare an outer terminal electrode paste.

(6) Formation of ESD Protection Device

Figure 6A:
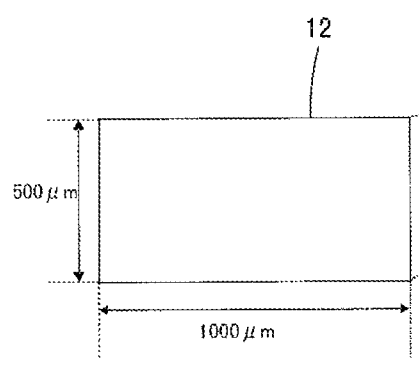
FIGS. 6(A) and 6(B) are views illustrating a step of manufacturing the ESD protection device 11 formed in the experimental example.
Figure 6B:
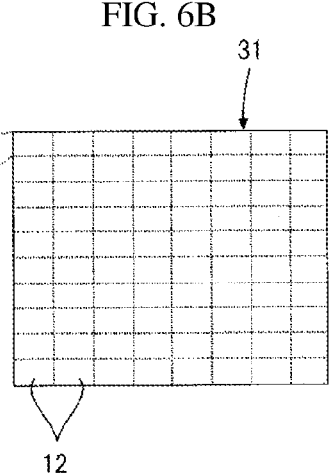

First, a mother board 31 formed from alumina as shown in FIG. 6(B) was prepared. As shown in FIG. 6(A), this mother board 31 is to be cut into a plurality of insulating substrates 12 each having dimensions of 500 μm by 1,000 μm. In addition, hereinafter, although steps are described and drawings are illustrated as if the steps are performed on the insulating substrate 12 obtained after the cutting of the mother board 31, unless otherwise particularly stated, it is to be understood that the steps are performed on the mother board 31.

Figure 7:
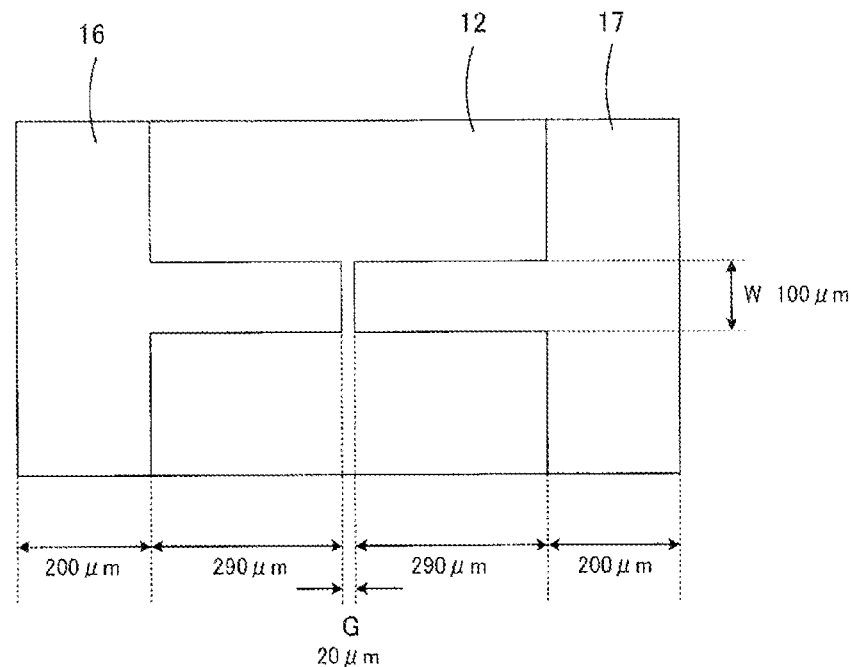
FIG. 7 is a plan view illustrating a step of manufacturing the ESD protection device 11 formed in the experimental example and showing the state in which first and second discharge electrodes 16 and 17 are formed on the insulating substrate 12 shown in FIG. 6(A).

Next, as shown in FIG. 7, the discharge electrode paste was applied on one primary surface of the insulating substrate 12 and then fired at 850° C. using a tunnel furnace in which the oxygen concentration was controlled so that copper contained in this discharge electrode paste was not oxidized, and as a result, the first and second discharge electrodes 16 and 17 facing each other with a gap G of 20 μm provided therebetween were formed. The width W between facing portions of the first and second discharge electrodes 16 and 17 was set to 100 μm. The dimensions of the other portions are also shown in FIG. 7.

Figure 8:
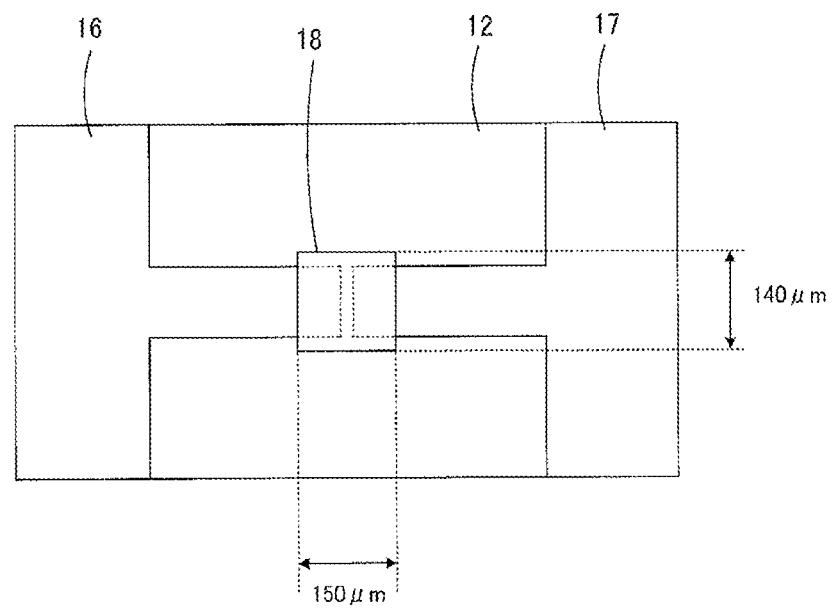
FIG. 8 is a plan view illustrating a step of manufacturing the ESD protection device 11 formed in the experimental example and showing the state in which the discharge auxiliary electrode 18 is formed after the step shown in FIG. 7.

Subsequently, as shown in FIG. 8, the discharge auxiliary electrode paste was applied so as to cover the gap G (see FIG. 7) and to connect the first and second discharge electrodes 16 and 17 facing each other and was then cured at 150° C. for 1 hour by a hot-wind drier, so that the discharge auxiliary electrode 18 was formed to have dimensions of 150 μm by 140 μm. In this step, as the discharge auxiliary electrode paste, a discharge auxiliary electrode paste containing one of the metal powders M-1 to M-12 shown in Tables 2 and 3 was used, and in the column of the "Metal Powder" in the following Table 4, the symbol of the metal powder used for each sample is shown.

Figure 9:
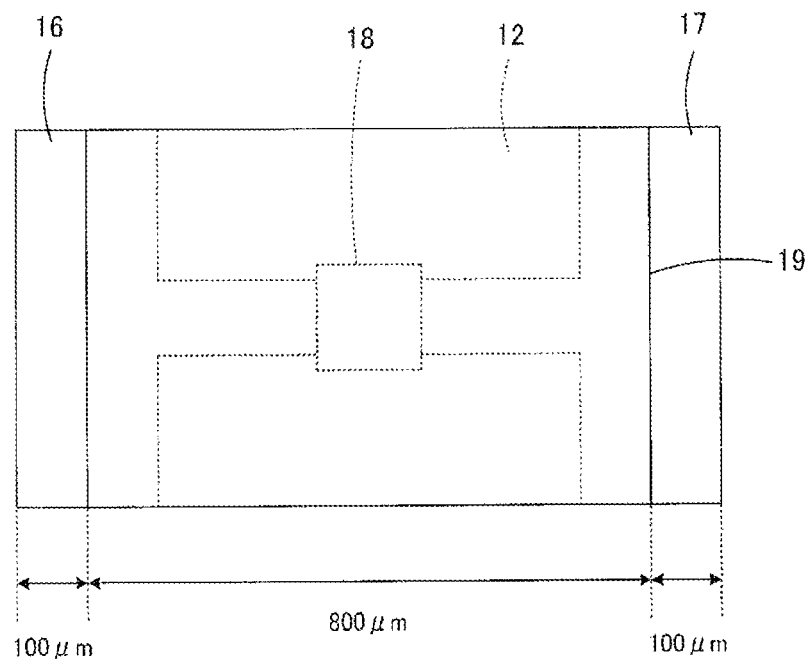
FIG. 9 is a plan view illustrating a step of manufacturing the ESD protection device 11 formed in the experimental example and showing the state in which a protective layer 19 is formed after the step shown in FIG. 8.

Next, as shown in FIG. 9, the protective layer paste was applied so as to cover the parts of the discharge electrodes 16 and 17 besides the discharge auxiliary electrode 18 and was then cured at 150° C. for 1 hour by a hot-wind drier to form the protective layer 19. The dimensions of the protective layer 19 are shown in FIG. 9.

Subsequently, the mother board 31 shown in FIG. 6(B) including a plurality of the insulating substrates 12 and processed by the above steps was cut into pieces each having dimensions of 500 μm by 1,000 μm to provide the insulating substrates 12 each as shown in FIG. 6(A).

Next, as shown in FIG. 1, the outer terminal electrode paste was applied to the two end portions of the insulating substrate 12 and then cured at 150° C. for 1 hour by a hot-wind drier to form the outer terminal electrodes 20 and 21 connected to the first and second discharge electrodes 16 and 17, respectively.

As described above, the ESD protection devices 11 each used as the sample were obtained.

<Characteristic Evaluation>

Next, the following characteristics of the ESD protection devices of the samples formed as described above were evaluated.

(1) Initial Short Circuit Characteristics

A direct voltage of 50 V was applied between the outer terminal electrodes of the ESD protection device of each sample, and the insulating resistance thereof was measured. An ESD protection device having an insulating resistance of $10^8 \Omega$ or more was judged as a device having good initial short circuit characteristics, and "○" is shown in the column of the "Initial Short Circuit" in Table 4. In contrast, an ESD protection device having an insulating resistance of less than $10^8\Omega$ was judged as a device having inferior initial short circuit characteristics, and "x" is shown in the same column as described above.

In addition, the ESD protection device judged as a device having inferior initial short circuit characteristics was judged not to be usable in practice, and the following characteristic evaluations (short circuit resistance and peak voltage characteristic) were not performed.

(2) Short Circuit Resistance

A voltage of 8 kV was repeatedly applied 100 times to the ESD protection device of each sample. The insulating resistance of each sample was measured at each voltage application, and when a resistance of less than $10^6\Omega$ was not measured at all, the sample was judged as a device having an excellent short circuit resistance, and "◯" is shown in the column of the "Short Circuit Resistance" in Table 4. When a resistance of $10^6$ of less than $10^8\Omega$ was measured, "Δ" is shown in the same column as described above. In addition, when a resistance of less than $10^6\Omega$ was measured at least one time, the sample was judged as a device having an inferior short circuit resistance, and "x" is shown in the same column as described above.

(3) Peak Voltage Characteristic

By the use of an electrostatic test gun, a static electricity of 8 kV was applied to the ESD protection device of each sample. In this step, a voltage measured by an oscilloscope was defined as the peak voltage. A device having a peak voltage of less than 700 V was judged as a device having an excellent peak voltage characteristic, and "◯" is shown in the column of the "Peak Voltage" in Table 4. A device having a peak voltage of 700 V or more was judged as a device having an inferior peak voltage characteristic, and "x" is shown in the same column as described above.

In addition, in Table 4, as for the "Peak Voltage", no samples were judged as "x".

(4) Comprehensive Evaluation

In the evaluation of the above "Initial Short Circuit", "Short Circuit Resistance", and "Peak Voltage", a sample evaluated as "◯" in all the above evaluation items is shown by "◯" in the column of the "Comprehensive Evaluation" in Table 4. In addition, a sample evaluated as "x" in at least one of the above evaluation items is shown by "x" in the same column as described above. Furthermore, a sample evaluated as "Δ" in at least one the above evaluation items and not evaluated as "x" in the other items is shown by "Δ" in the same column as described above.

TABLE 4

| Sample No. | Metal Powder | Initial Short Circuit | Short Circuit Resistance | Peak Voltage | Comprehensive Evaluation |
|---|---|---|---|---|---|
| 1 | M-1 | ◯ | ◯ | ◯ | ◯ |
| 2 | M-2 | ◯ | ◯ | ◯ | ◯ |
| 3 | M-3 | ◯ | ◯ | ◯ | ◯ |
| 4 | M-4 | ◯ | ◯ | ◯ | ◯ |
| 5 | M-5 | ◯ | ◯ | ◯ | ◯ |
| 6 | M-6 | X | — | — | X |
| 7 | M-7 | ◯ | ◯ | ◯ | ◯ |
| 8 | M-8 | ◯ | ◯ | ◯ | ◯ |
| 9 | M-9 | ◯ | ◯ | ◯ | ◯ |
| 10 | M-10 | ◯ | Δ | ◯ | Δ |
| 11 | M-11 | X | — | — | X |
| 12 | M-12 | X | — | — | X |

In Table 4, Samples 6, 11, and 12 are out of the scope of the present invention.

According to the ESD protection device of each of Samples 1 to 5 and 7 to 9 which were within the scope of the present invention, since the metal grain structure in the discharge auxiliary electrode had a core-shell structure in which a shell portion was formed of a metal oxide having cavities, excellent ESD protection characteristics (initial short circuit characteristic, short circuit resistance, and peak voltage characteristic) were obtained. In addition, according to Sample 10 within the scope of the present invention, although the short circuit resistance was inferior to that of each of Samples 1 to 5 and 7 to 9, the other characteristics were excellent. Incidentally, in the ESD protection device according to Sample 10, as the metal grains in the discharge auxiliary electrode, the metal powder M-10 shown in Table 3, that is, an aluminum powder having a core-shell structure, was used.

In contrast, according to the ESD protection device of each of Samples 6, 11, and 12 which were out of the scope of the present invention, since the metal grains in the discharge auxiliary electrode each had not the core-shell structure, an exposed portion of the copper component was increased, and it is estimated that the initial short circuit defect occurred.

11 ESD protection device
12 insulating substrate
16, 17 discharge electrode
18 discharge auxiliary electrode
19 protective layer
20, 21 outer terminal electrode
22 core portion
23 shell portion
24 metal grain
25 alloy grain
26 cavity
27 insulating resin
G gap

The invention claimed is:

1. An ESD protection device comprising:
   a first discharge electrode and a second discharge electrode disposed to face each other;
   a discharge auxiliary electrode formed to bridge the first discharge electrode and the second discharge electrode; and
   an insulating substrate holding the first discharge electrode, the second discharge electrode and the discharge auxiliary electrode,
   wherein the discharge auxiliary electrode is formed of an aggregate of metal grains each having a core-shell structure comprising a core portion primarily formed of a first metal and a shell portion primarily formed of a metal oxide containing a second metal, and
   the aggregate of the metal grains further includes an insulating resin bonding the metal grains to each other.

2. The ESD protection device according to claim 1, wherein a thickness of the shell portion is 50 to 1,500 nm.

3. The ESD protection device according to claim 1, wherein the second metal is more susceptible to oxidation than the first metal.

4. The ESD protection device according to claim 1, wherein the first metal includes copper or a copper-based alloy containing copper as a primary component.

5. The ESD protection device according to claim 1, wherein the metal oxide containing the second metal includes aluminum oxide.

6. The ESD protection device according to claim 1, wherein the core portion contains the second metal as an accessory component.

7. The ESD protection device according to claim 1, wherein the shell portion has a cavity.

8. A method for manufacturing an ESD protection device, the method comprising the steps of:
preparing an insulating substrate;
forming a first discharge electrode and a second discharge electrode on the insulating substrate with a discharge gap provided therebetween;
preparing metal grains each having a core-shell structure comprising a core portion primarily formed of a first metal and a shell portion primarily formed of a metal oxide containing a second metal more susceptible to oxidation than the first metal;
preparing an insulating resin;
mixing the metal grains and the insulating resin to form a discharge auxiliary electrode paste;
applying the discharge auxiliary electrode paste to the insulating substrate so as to cover the discharge gap and connect the first discharge electrode to the second discharge electrode; and
curing the discharge auxiliary electrode paste to provide a discharge auxiliary electrode,
wherein the step of preparing metal grains each having a core-shell structure includes:
a step of preparing an alloy powder of an alloy containing the first metal and the second metal;
a core-shell structure forming step in which the alloy powder is heat-treated in an atmosphere at an oxygen concentration at which the first metal is not oxidized and the second metal is oxidized so that in each of the metal grains forming the alloy powder, the second metal is moved to a surface of each of the metal grains and is oxidized when reaching the surface to form the metal oxide containing the second metal, the shell portion is formed from the metal oxide as a primary component, and the core portion is formed from the first metal as a primary component which remains after the movement of the second metal to the surface of the alloy grain; and
a core-shell bonding step in which a heat treatment is then performed so that in each of the metal grains, the core portion primarily formed of the first metal and the shell portion primarily formed of the metal oxide containing the second metal are bonded to each other.

9. The method for manufacturing an ESD protection device according to claim 8,
wherein the step of preparing metal grains each having a core-shell structure further includes a cavity forming step performed following the core-shell bonding step,
wherein in the cavity forming step, a temperature of the heat treatment in the core-shell bonding step is decreased so that in each of the metal grains, the core portion primarily formed of the first metal is more contracted than the shell portion primarily formed of the metal oxide containing the second metal to form a cavity in the shell portion.

10. The method for manufacturing an ESD protection device according to claim 8,
wherein the step of preparing an alloy powder includes a step of manufacturing the alloy powder by an atomizing method.

11. The ESD protection device according to claim 2, wherein the second metal is more susceptible to oxidation than the first metal.

12. The ESD protection device according to claim 2, wherein the first metal includes copper or a copper-based alloy containing copper as a primary component.

13. The ESD protection device according to claim 3, wherein the first metal includes copper or a copper-based alloy containing copper as a primary component.

14. The ESD protection device according to claim 2, wherein the metal oxide containing the second metal includes aluminum oxide.

15. The ESD protection device according to claim 3, wherein the metal oxide containing the second metal includes aluminum oxide.

16. The ESD protection device according to claim 4, wherein the metal oxide containing the second metal includes aluminum oxide.

17. The ESD protection device according to claim 2, wherein the core portion contains the second metal as an accessory component.

18. The ESD protection device according to claim 3, wherein the core portion contains the second metal as an accessory component.

19. The ESD protection device according to claim 4, wherein the core portion contains the second metal as an accessory component.

20. The ESD protection device according to claim 5, wherein the core portion contains the second metal as an accessory component.

* * * * *